UNITED STATES PATENT OFFICE.

PAUL JULIUS AND ERNST FUSSENEGGER, OF LUDWIGSHAFEN-ON-THE-RHINE, AND LOUIS BLANGEY, OF MANNHEIM, GERMANY, ASSIGNORS TO BADISCHE ANILIN & SODA FABRIK, OF LUDWIGSHAFEN-ON-THE-RHINE, GERMANY, A CORPORATION.

DERIVATIVES OF 1-AMINO-7-NAPHTHOL.

1,188,544.  Specification of Letters Patent.  Patented June 27, 1916.

No Drawing.  Application filed July 9, 1914. Serial No. 849,872.

*To all whom it may concern:*

Be it known that we, PAUL JULIUS and ERNST FUSSENEGGER, citizens of the Austro-Hungarian Empire, residing at Ludwigshafen-on-the-Rhine, Germany, and LOUIS BLANGEY, citizen of the Swiss Empire, residing at Mannheim, Germany, have invented new and useful Improvements in Derivatives of 1-Amino-7-Naphthol, of which the following is a specification.

We have discovered new compounds which are derivatives of 1-amino-7-naphthol and which possess a constitution corresponding to the formula:—

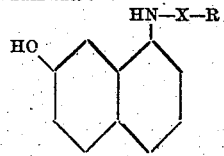

in which X represents an oxygen-containing group consisting of more than one, and less than four, atoms, which may be referred to as a simple divalent acidyl group containing oxygen and R represents a halogenated benzene residue which contains no other substituent besides halogen.

Our new compounds can be obtained by causing a halogenated aromatic acid chlorid, or a halogenated sulfonyl-chlorid, to react on 1-amino-7-naphthol, and they consist when pure of colorless crystalline compounds which are very difficultly soluble in water, but are soluble in caustic soda solution and which combine with diazotized ortho-nitranilin giving reddish coloring matters. Coloring matters obtained by the use of our new products are claimed in a separate application Serial No. 849,873 of even date.

The following example will serve to illustrate further the nature of this invention, which, however, is not confined to this example. The parts are by weight.

Example: Suspend 159 parts of 1-amino-7-naphthol in 2000 parts of mono-chlorbenzene and then, while stirring at the ordinary temperature, allow 175 parts of ortho-chlor-benzoyl-chlorid to run into the suspension. Continue stirring for twelve hours, then add an aqueous solution of 53 parts of calcined soda and distil off the chlorbenzene by means of steam. Treat the residue with 200 parts of 35 per cent. caustic soda solution, whereupon the product goes into solution, filter this solution if necessary, and then, after cooling, add excess of dilute hydrochloric acid. Filter off the ortho-chlor-benzoyl-1-amino-7-naphthol, wash it with water, press it, and dry it at a moderate temperature. On recrystallization from xylene it is obtained as a white crystalline powder, which melts at from about 157° to 158° C. and is very difficultly soluble in water and easily soluble in dilute alkali and in alcohol. Instead of mono-chlor-benzene other indifferent solvent can be employed and, if desired, the condensation can be carried out in the presence of sodium acetate, or of other compound capable of fixing hydrochloric acid. A similar process can be followed if ortho-chlor-benzoyl-chlorid be replaced by other halogenated derivatives of benzoyl-chlorid, or by halogenated derivatives of benzene-sulfo-chlorid, such as, for instance para-chlor-benzoyl-chlorid, 2.4-dichlor-benzoyl-chlorid, or 2.6-dichlor-benzoyl-chlorid, or para-dichlor-benzene-sulfonyl-chlorid, or 2.5-dichlor-benzene-sulfonyl-chlorid.

The following table gives the melting points of some of the products of our invention.

| Product from 1-amino-7-naphthol + | Melting point. |
|---|---|
| p-Chlorbenzoyl-chlorid | 230–231° C. |
| 2.4-Dichlorbenzoyl-chlorid | 182–183° C. |
| 2.6-Dichlorbenzoyl-chlorid | 230–232° C. |
| p-Chlorbenzene-sulfonyl-chlorid | 213–214° C. |
| 2.5-Dichlorbenzene-sulfonyl-chlorid | 185–188° C. |

Now what we claim is:—

1. The new derivatives of 1-amino-7-naphthol possessing a constitution corresponding to the formula:—

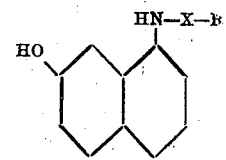

in which X represents a divalent acidyl group containing oxygen, and R is a halogenated benzene residue, which new derivatives consist when pure of colorless crystalline powders, are very difficultly soluble in water, but are soluble in caustic soda solution and combine with diazotized ortho-nitranilin giving reddish coloring matters.

2. The new derivatives of 1-amino-7-naphthol, which possess a constitution corresponding to the formula:—

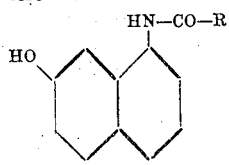

in which R represents a halogenated benzene residue, which new derivatives consist when pure of colorless crystalline powders, are free from sulfur, are very difficultly soluble in water, but soluble in caustic soda solution and combine with diazotized nitranilin giving reddish coloring matters.

3. The new derivative of 1-amino-7-naphthol possessing the constitution corresponding to the formula:—

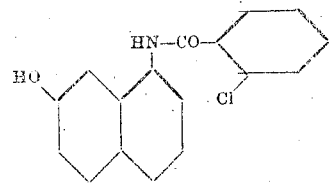

which consists when pure of a colorless crystalline powder, melting at about 157–158° C., is very difficultly soluble in water, but is soluble in caustic alkali solution and combines with diazotized ortho-nitranilin yielding a Turkey red compound.

In testimony whereof we have hereunto set our hands in the presence of two subscribing witnesses.

PAUL JULIUS.
ERNST FUSSENEGGER.
LOUIS BLANGEY.

Witnesses:
J. ALEC. LLOYD,
H. MERLE COCHRAN.